United States Patent
Reyal et al.

(10) Patent No.: US 8,341,900 B2
(45) Date of Patent: Jan. 1, 2013

(54) STRUCTURE FOR MOUNTING ON A BUILDING WALL FRAMES FOR HOLDING PANELS SUCH AS PHOTOVOLTAIC PANELS

(75) Inventors: Jean-Pierre Reyal, Eragny (FR); Yves Jautard, Vernet les Bains (FR)

(73) Assignees: Arcelormittal-Stainless and Nickel Alloys, Saint Denis (FR); Solarte, Ria Sirach (FR)

(*) Notice: Subject to any disclaimer, the term of this patent is extended or adjusted under 35 U.S.C. 154(b) by 334 days.

(21) Appl. No.: 12/596,654

(22) PCT Filed: Apr. 18, 2008

(86) PCT No.: PCT/FR2008/050699
§ 371 (c)(1),
(2), (4) Date: Feb. 4, 2010

(87) PCT Pub. No.: WO2008/145913
PCT Pub. Date: Dec. 4, 2008

(65) Prior Publication Data
US 2010/0132274 A1  Jun. 3, 2010

(30) Foreign Application Priority Data

Apr. 20, 2007 (FR) ........................ 07 54606

(51) Int. Cl.
*E04D 13/18* (2006.01)
*F24J 2/52* (2006.01)

(52) U.S. Cl. ........ 52/235; 52/173.3; 52/506.08; 52/511; 52/667; 52/668

(58) Field of Classification Search .................. 52/173.3, 52/235, 460, 463, 466, 469, 506.08, 508, 52/511, 667, 668; 126/623; 136/251, 291; 165/48.2

See application file for complete search history.

(56) References Cited

U.S. PATENT DOCUMENTS

| 690,121 | A | * | 12/1901 | Rendle | 52/463 |
|---|---|---|---|---|---|
| 1,214,928 | A | * | 2/1917 | Lachman | 52/668 |
| 1,789,280 | A | * | 1/1931 | Armstrong | 403/346 |
| 3,190,208 | A | * | 6/1965 | Styne | 454/296 |
| 3,745,735 | A | * | 7/1973 | Casano | 52/390 |

(Continued)

FOREIGN PATENT DOCUMENTS

DE  203 04 676 U1  7/2003

(Continued)

*Primary Examiner* — Robert Canfield
(74) *Attorney, Agent, or Firm* — Sughrue Mion, PLLC

(57) ABSTRACT

Structure (1) for mounting, on a building wall, at least one frame (50) consisting of a rectangular framework (51), comprising a carcass (2) made of at least two uprights (3) and at least two crossbars (4) assembled so as to form at least one rectangular underframe (15) adapted for receiving a frame (50), and means for fixing at least one frame on the carcass, each upright (3) having a central core (31) bordered by two side wings (32, 33) comprising recesses (38, 39) for receiving the crossbars (4). Each crossbar (4) has a central core (40) and side wings (41, 42) comprising recesses in line with the uprights (3) at the intersections between the crossbars (4) and the uprights (3) in such a way that the wings of the uprights (3) and the crossbars (4), extending on the inner periphery of the rectangular underframe (15), form a projecting border on which a frame (5) may be fitted. Wall provided with a structure of this type on which panel-holding frames are mounted.

19 Claims, 7 Drawing Sheets

U.S. PATENT DOCUMENTS

| | | | |
|---|---|---|---|
| 3,844,087 A * | 10/1974 | Schultz et al. | 52/200 |
| 4,068,439 A * | 1/1978 | Andersen | 52/506.08 |
| 4,194,325 A * | 3/1980 | Chalpin, Jr. | 52/14 |
| 4,276,731 A * | 7/1981 | Henggeler et al. | 52/506.08 |
| 4,492,066 A * | 1/1985 | LaLonde | 52/668 |
| 4,621,472 A * | 11/1986 | Kloke | 52/204.591 |
| 4,683,693 A * | 8/1987 | Rockar et al. | 52/198 |
| 4,850,167 A * | 7/1989 | Beard et al. | 52/200 |
| 5,092,087 A * | 3/1992 | Kane et al. | 52/15 |
| 5,369,924 A * | 12/1994 | Neudorf | 52/235 |
| 6,065,255 A * | 5/2000 | Stern et al. | 52/173.3 |
| 7,428,801 B2 * | 9/2008 | Ostenfeldt | 52/144 |
| 2010/0037549 A1 * | 2/2010 | Lynch et al. | 52/506.08 |
| 2010/0162641 A1 * | 7/2010 | Reyal et al. | 52/173.3 |
| 2011/0302857 A1 * | 12/2011 | McClellan et al. | 52/173.3 |

FOREIGN PATENT DOCUMENTS

| | | |
|---|---|---|
| EP | 0 002 432 A1 * | 7/1978 |
| EP | 0 949 686 A1 | 10/1999 |
| EP | 1 341 240 A1 | 9/2003 |
| JP | 08-312088 A | 11/1996 |
| JP | 10-122125 A | 5/1998 |
| WO | 00/12839 A | 3/2000 |

* cited by examiner

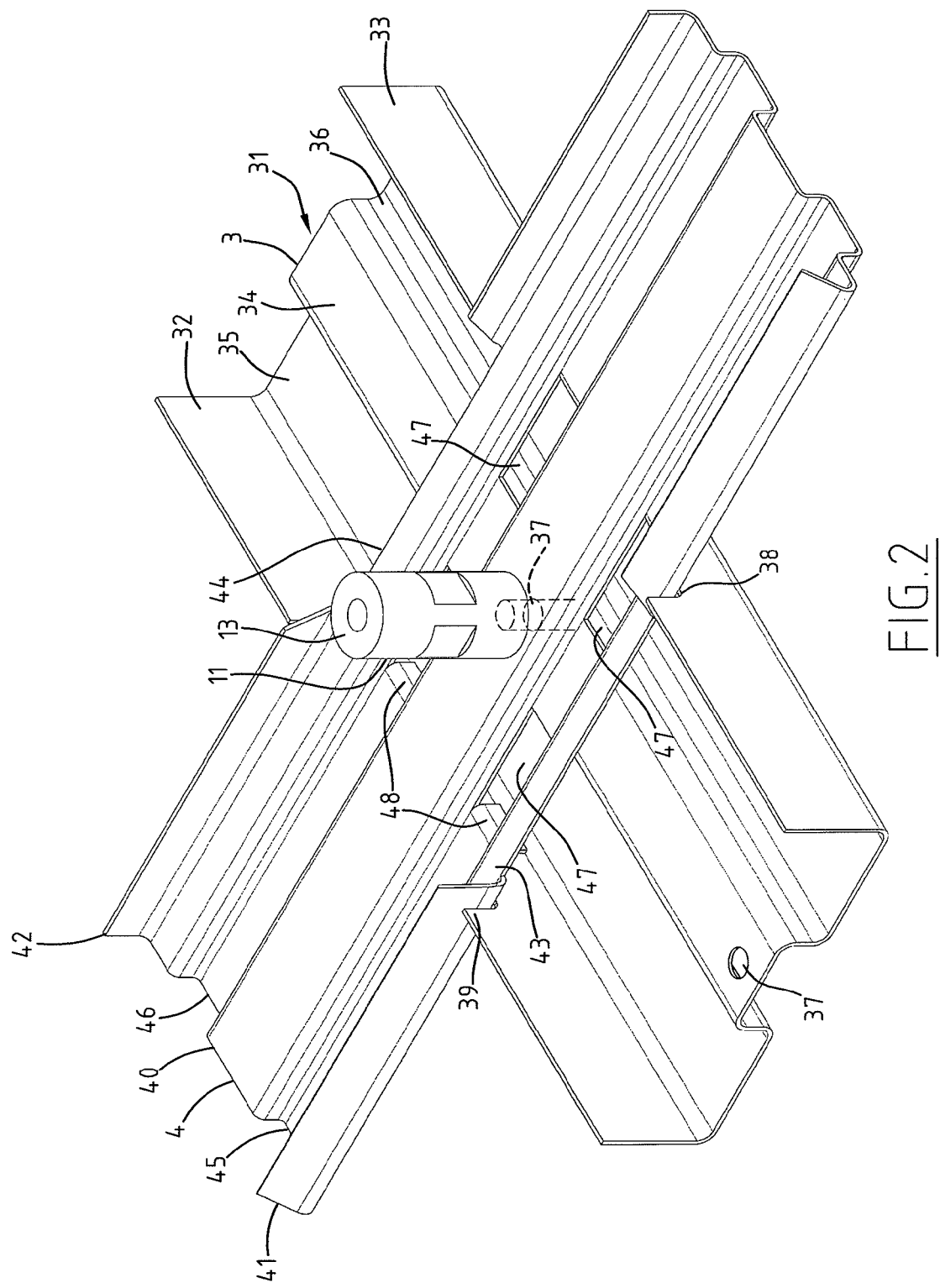

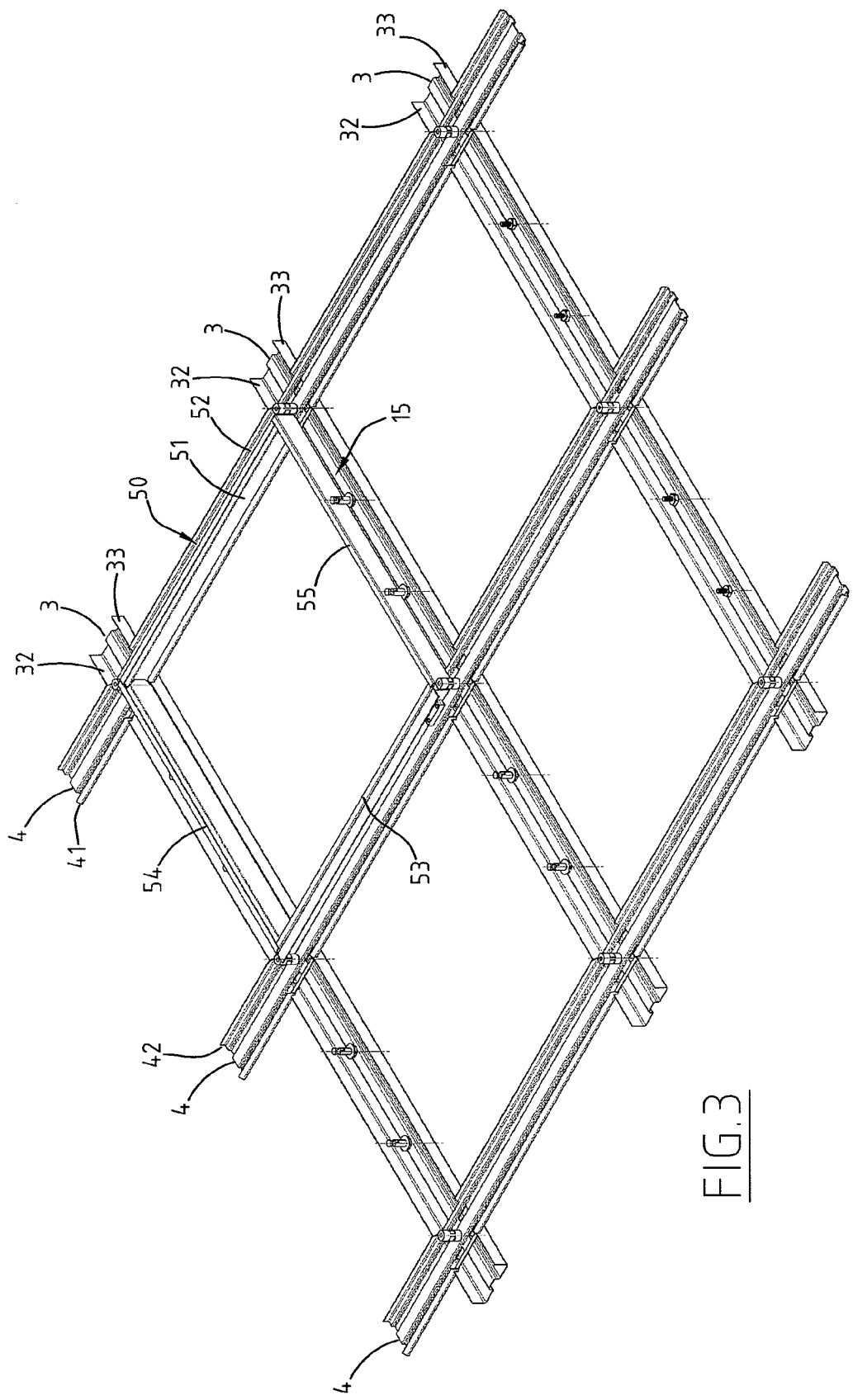

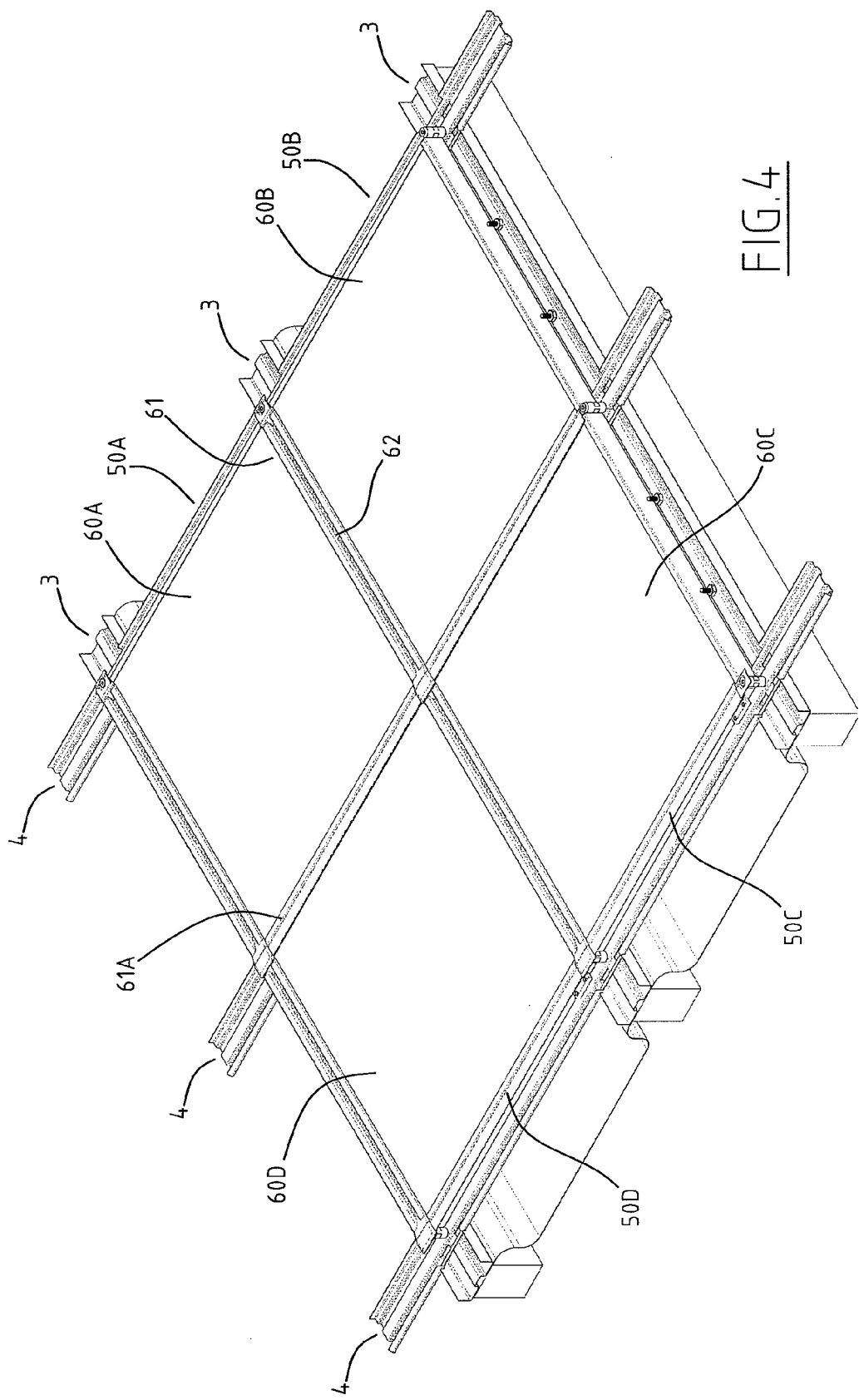

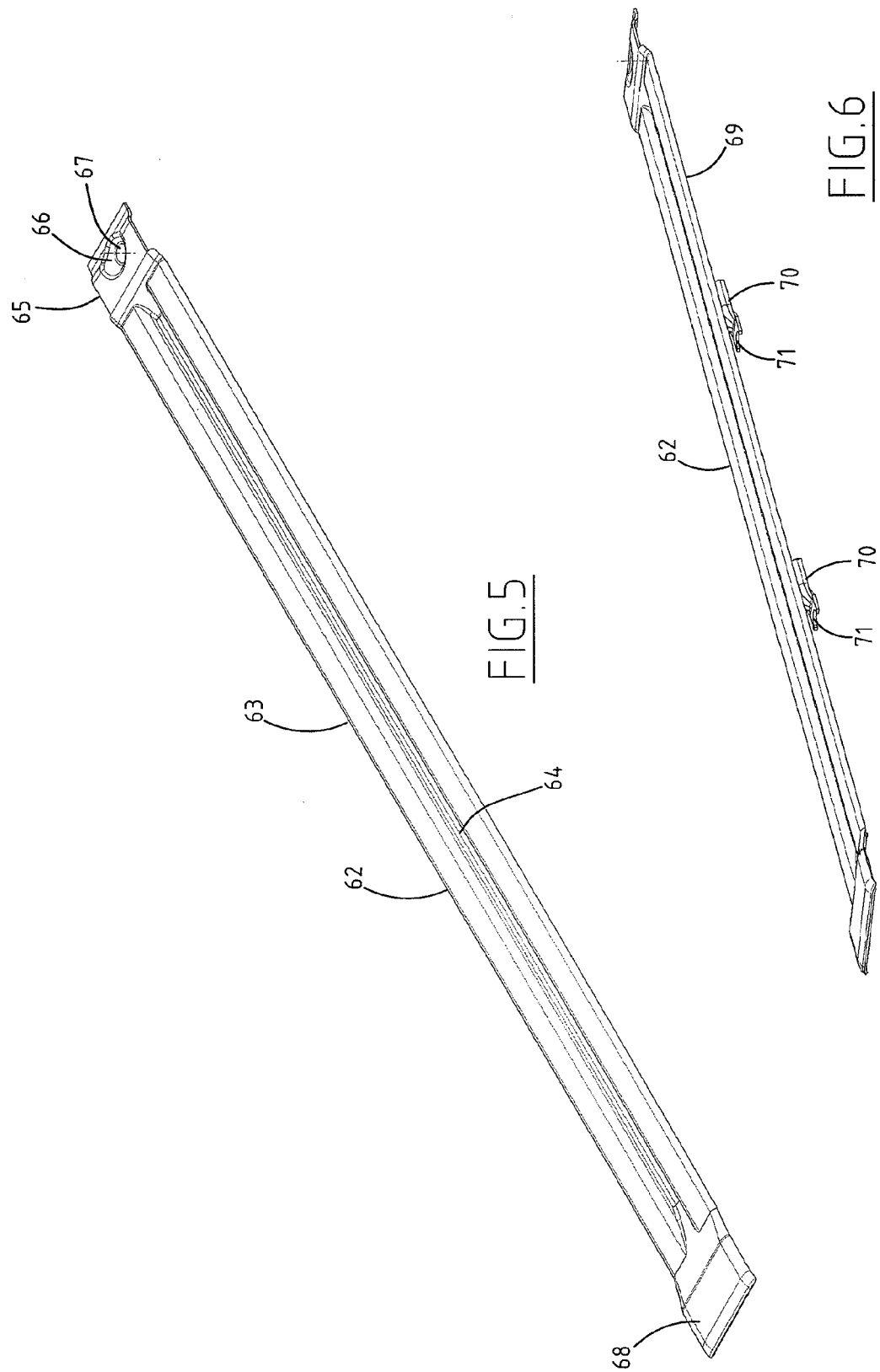

STRUCTURE FOR MOUNTING ON A BUILDING WALL FRAMES FOR HOLDING PANELS SUCH AS PHOTOVOLTAIC PANELS

CROSS REFERENCE TO RELATED APPLICATIONS

This application is a National Stage of International Application No. PCT/FR2008/050699 filed Apr. 18, 2008, claiming priority based on French Patent Application No. 07 54606, filed Apr. 20, 2007, the contents of all of which are incorporated herein by reference in their entirety.

The present invention relates to a structure for mounting a panel-holding frame on the wall of a building, such as a roof pan. The structure is applicable in particular to the mounting of frames for holding photovoltaic panels.

In order to equip buildings such as houses with electricity generators employing solar energy, sets of panels consisting of a plurality of photovoltaic cells are disposed, for example, on the roofs of these buildings.

These panels generally consist of a stack of differing layers of glass, silicon, conductors and polymers. The sides of the generally square silicon cells can be as great as 200 mm. The cells are connected in series then bonded between two sheets of glass or between one sheet of glass and differing layers of polymer. By way of example, a module having a nominal voltage of 12 V is generally constructed by connecting 36 monocrystalline or polycrystalline cells in series. These assemblies of 36 cells are then connected in parallel. 72 silicon cells are thus used in the case of a 24 V module. Panels of this type may have substantial dimensions of approximately 1 metre by 2 metres.

To mount the photovoltaic cells on the walls of buildings, holding frames are used, for example holding frames comprising a peripheral framework consisting for example of a hollow structure obtained by folding a metal strip. However, these frames have to be fixed on walls of buildings in such a way as to keep the panels in place and in such a way as to be able to withstand the forces resulting from weathering. In particular, the fixing of the panels must be able to withstand the weight of snow or pull-out forces resulting from a strong wind.

Conventionally, frames of this type are arranged above the roofs of buildings, and this has the drawback in particular that they are not very aesthetically pleasing. Furthermore, the space located between the panels and the roof can become clogged for example with waste such as dead leaves.

The object of the present invention is to overcome these drawbacks by proposing a means for fixing, to the wall of a building such as a roof or a façade, frames for holding panels, in particular electrically active panels such as photovoltaic panels, which makes it possible to insert the assembly consisting of the panels into the roof or the façade of the building.

The invention accordingly relates to a structure for mounting on a building wall at least one frame consisting of a rectangular framework. It comprises a carcass made of at least two uprights and at least two crossbars assembled so as to form at least one rectangular underframe adapted for receiving a frame, and means for fixing at least one frame on the carcass, each upright having a central core bordered by two side wings comprising recesses for receiving the crossbars, each crossbar having a central core and side wings comprising recesses in line with the uprights at the intersections between the crossbars and the uprights in such a way that the wings of the uprights and the crossbars, extending on the inner periphery of the rectangular underframe, define a projecting border on which a frame may be fitted.

Preferably, the core of an upright comprises at least one gutter extending over the entire length of the upright.

The gutter may be delimited by at least one rib extending over the entire length of the upright.

Preferably, the core of a crossbar comprises at least one opening intended to open above the gutter of an upright on which the crossbar rests.

Preferably, the core of a crossbar is shaped in such a way as to have, in the axial part thereof, at least in the region of intersection with an upright, a contact face projecting in the same direction as the wings.

A side wing of a crossbar may be inclined towards the interior of the crossbar in such a way as to allow the attachment of a frame held by the structure.

The means for fixing at least one frame on the carcass comprise for example anchoring devices and fixing beadings held by the anchoring devices and extending above the uprights, the anchoring devices and the fixing beadings being provided in such a way that the fixing beadings come into contact at least with the upper face of an edge of a frame.

At least one fixing means may comprise a locking head in the upper part thereof, and the fixing beading then comprises a locking lug adapted to be clipped onto the locking head.

At least one fixing means may comprise a screw head in the upper part thereof, and the fixing beading comprises at one end thereof a screw paddle adapted to be fixed to the screw head by means of a screw and at the other end thereof a cover paddle comprising a clipping lug adapted to be clipped onto a screw paddle.

The fixing means consists for example of a screw body comprising a distal screw spindle for screwing into a structural element of the wall of a building and a proximal screw spindle separated from the distal screw spindle by a means for entraining the screw body, and of a spacer adapted to be screwed onto the proximal screw spindle of the screw body, the spacer comprising a locking head or screw head.

Preferably, the fixing beadings are adapted to extend on either side of a region for separation of two adjacent frames, in such a way as to provide tight covering of the separation region of the frames.

The invention further relates to a building wall comprising a structure according to the invention.

The wall may form a roof pan and comprise parallel beams, the uprights of the structure extending along parallel beams and being fixed to said beams.

The wall may further comprise trays, in particular trays made of plastics material, wood, glue-laminated timber, plywood or metal or comprising double glazing panels or made of a multilayer insulating material, fixed to the parallel beams below the structure.

The wall comprises for example at least one panel of photovoltaic cells fixed to a frame by the structure.

The invention will now be described in greater detail but in a non-limiting manner with reference to the appended figures, in which:

FIG. 2 is an enlarged perspective view of the region of intersection of an upright and a crossbar of a carcass belonging to a structure for the mounting of panel-holding frames on a roof;

FIG. 3 is a perspective view of the structure of FIG. 1, in which a frame is installed;

FIG. 4 is a perspective view of the structure shown in FIG. 1, in which at least four frames each holding a panel are mounted;

FIGS. 5 and 6 are two perspective views of a beading for fixing a frame to the frame-holding structure;

Figure 1:
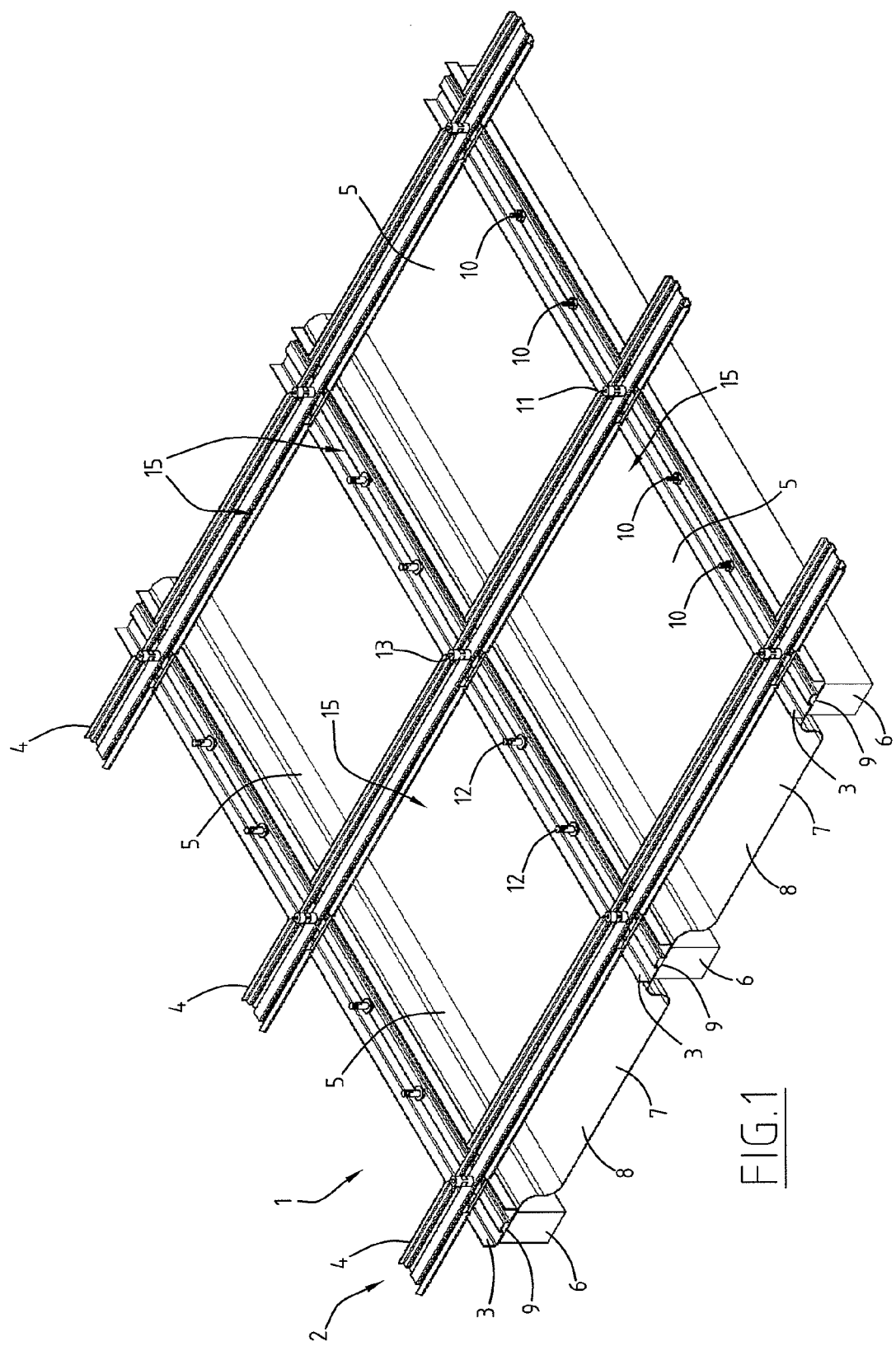
FIG. 1 is a perspective view of a portion of the structure for mounting, on the roof of a building, frame for holding electrically active panels.

The structure, generally designated as 1 in FIG. 1, consists of a carcass, generally denoted as 2, which consists of uprights 3 and crossbars 4, arranged in such a way as to form a lattice of rectangular meshes 5. The uprights 3 extend along rafters 6 of the roof framing, each upright 3 being fixed to a rafter.

The space 7 between two adjacent rafters is obscured by a metal tray 8 of which the edges 9 rest on the rafters 6 and are kept in position by the uprights 3.

The metal trays 8 consist for example of a multilayer insulating material consisting of a polymer core confined between two metal sheets, for example stainless steel metal sheets, or galvanized steel, or optionally lacquered and galvanized steel, metal sheets.

These metal trays 8 provide a degree of sealing below the panels fixed to the carcass 2, on the one hand, and on the other hand, provide thermal insulation when the panels fixed to the carcass 2 are subjected to solar radiation and can therefore heat up and consequently heat the atmosphere below the lower surface thereof.

These trays may consist of other materials such as plastics materials, wood, glue-laminated timber or plywood.

In the case of glass sheets, the trays may consist of double glazing.

The uprights 3 are fixed to the rafters by fixing means 10 arranged between two crossbars 4 arranged at the joint between a crossbar and an upright.

The fixing means 10 and 11 comprise bodies which are screwed into the rafters 6, onto which bodies spacers 12 and 13 may also be screwed, in order to hold means for the fixing of frames on the carcass. These fixing means and these spacers will be described in greater detail hereinafter.

As can be seen more clearly in FIG. 2, an upright 3 is a profile which comprises a central core 31 bordered by two vertical wings 32 and 33. The central core 31 comprises a central rib 34 projecting towards the top of the upright, i.e. in the direction in which the two side wings 32 and 33 extend. The central rib 34 is delimited by two side ribs 35 and 36 which extend in the opposite direction to the central rib. These two side ribs 35 and 36, also delimited by side wings 32 and 33 respectively, form gutters for the drainage of water which might result from the infiltration of rainwater. The upwardly projecting central rib 34 comprises holes 37 for receiving fixing means. As these holes are arranged in the upper part of the central rib 34, the water which may flow in the gutters 35 and 36 cannot penetrate through the holes 37. The side wings 32 and 33 comprise recesses 38 and 39 for receiving crossbars 4 in the joining regions between the uprights and the crossbars. These recesses are spaced regularly along the uprights at distances adapted in such a way that the meshes 5 delimited by the uprights and the crossbars can receive frames.

The crossbar 4, perpendicular to the upright 3, is also a profile comprising a central core 40 bordered by two side wings 41 and 42. The side wings 41 and 42 comprise recesses 43 and 44 arranged in the region of the joint between a crossbar and an upright. The central core of the crossbar 40 is shaped in such a way as to have two ribs 45 and 46 projecting on the lower part of the crossbar and intended to form gutters to receive water which might infiltrate below panels held by the carcass or condensation. The two ribs 45 and 46 form gutters comprising openings 47 consisting of breaks located above the gutters 35 and 36 of an upright in the region of the joint between the crossbar 4 and the upright 3. These openings are intended to allow the drainage of water collected in the gutters 45 and 46 of the crossbar so as to cause it to drain in the gutters 35 and 36 of the uprights, which are oriented in the direction of the rafters of the framing of a roof. The breaks 47 comprise tongues 48 which project below the lower face of the crossbar and which can be embedded in the upright in order to lock the crossbar relative to the upright and to ensure that they are assembled orthogonally.

At the joint between the crossbar 4 and the upright 3, the crossbar is fixed to the upright via a fixing means 11 comprising a spacer 13 which acts as a nut allowing the crossbar 4 to be clamped against the upright 3. This fixing means will be described in greater detail hereinafter.

The wing 42 of the crossbar 4, to be arranged in the upstream part of the carcass, is perpendicular to the core 40 of the crossbar 4. The wing 41 is located in the downstream part of the carcass and is inclined towards the inside of the crossbar 4.

Owing to the arrangement of the recesses 43, 44 provided in the wings 41, 42 of the crossbar, in such a way that the side wings of the uprights and the crossbars constitute an upwardly projecting border extending on the inner periphery of each mesh 5, bearing in mind that the wings 32 and 33 of the upright rise to a sufficient height to extend above the core of the crossbars 4. Thus, each mesh 5 delimited by two adjacent uprights and two adjacent crossbars constitutes an underframe 15 on which a frame for holding a panel can be arranged.

Referring to FIG. 3, a frame, designated generally as 50 and intended to receive a panel (not shown in the figure), consists of a framework 51 comprising end uprights 52 and 53 and side uprights designated as 54 and 55 and having a trapezoidal cross-section. This frame is fitted on the projecting border which extends on the inner periphery of the central opening of an underframe 15. The upper end upright 52 fits along the wing 41 of a crossbar 4 which is folded inwards and thus engages the upper end upright 51. The three other uprights 53, 54 and 55 are placed parallel to the side wings 32, 33 and 42 of the differing uprights and crossbars which form the underframe.

FIG. 4 shows four frames 50A, 50B, 50C, 50D which support panels 60A, 60B, 60C, 60D respectively, mounted on the structure consisting of the uprights 3 and crossbars 4, arranged in such a way as to form rectangular paving.

Two adjacent frames 50A and 50B arranged side by side horizontally, parallel to the crossbars 4, are separated by a space or separation region 61 which extends above an upright 3. This separation region 61 is covered by a fixing beading 62 which is held by the anchoring devices 10 and 11 arranged along the upright 3.

Each fixing beading is of a length slightly greater than the length of a side of a framework 50A or 50B, and all the spaces located between two adjacent frameworks and extending parallel to uprights 3 are covered by fixing beadings 62.

Figure 9:
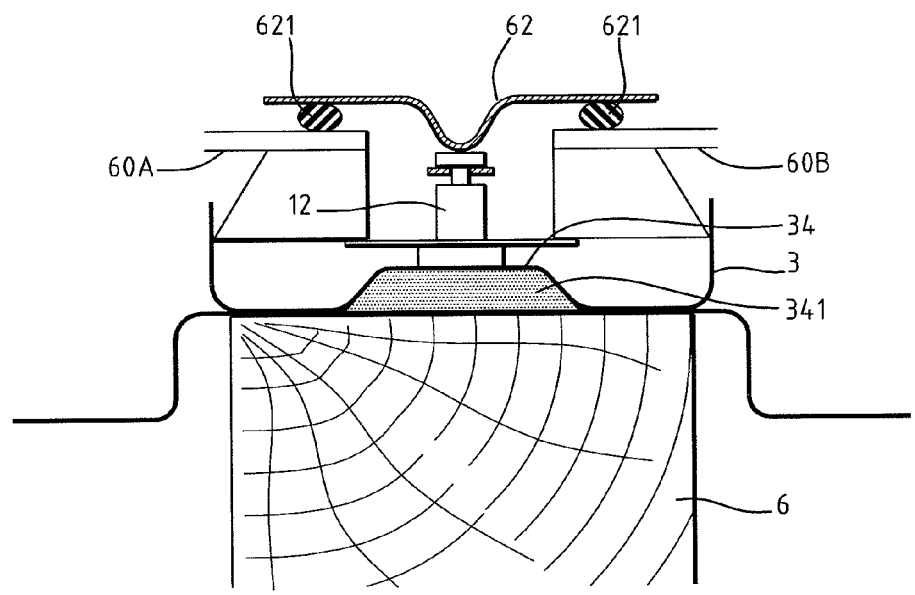
FIG. 9 is a sectional view of the region of a joint between two adjacent frames.

Referring to FIG. 9, flexible elastomeric seals 621 are arranged between the uprights of the frame 60A and 60B.

This provides a seal along the regions of the vertical joints between adjacent panels.

Furthermore, a rigid seal 341 fills the space between the central rib 34 of the upright 3 and the rafter 6 in order to avoid condensation phenomena.

A fixing beading 62 is shown in greater detail in FIGS. 5 and 6.

The fixing beading, designated generally as 62 in FIG. 5, includes a longitudinal body 63 comprising a central rib 64 intended to provide high rigidity. The body 63 of the fixing beading ends at one of the ends thereof in a screw paddle 65 comprising a seat 66 for receiving a screw head, the seat 66 comprising a central hole 67 for the body of a screw to pass through.

The other end of the fixing beading 62 comprises a covering and locking paddle 68 for covering the screw paddle of an adjacent fixing beading.

Figure 7:
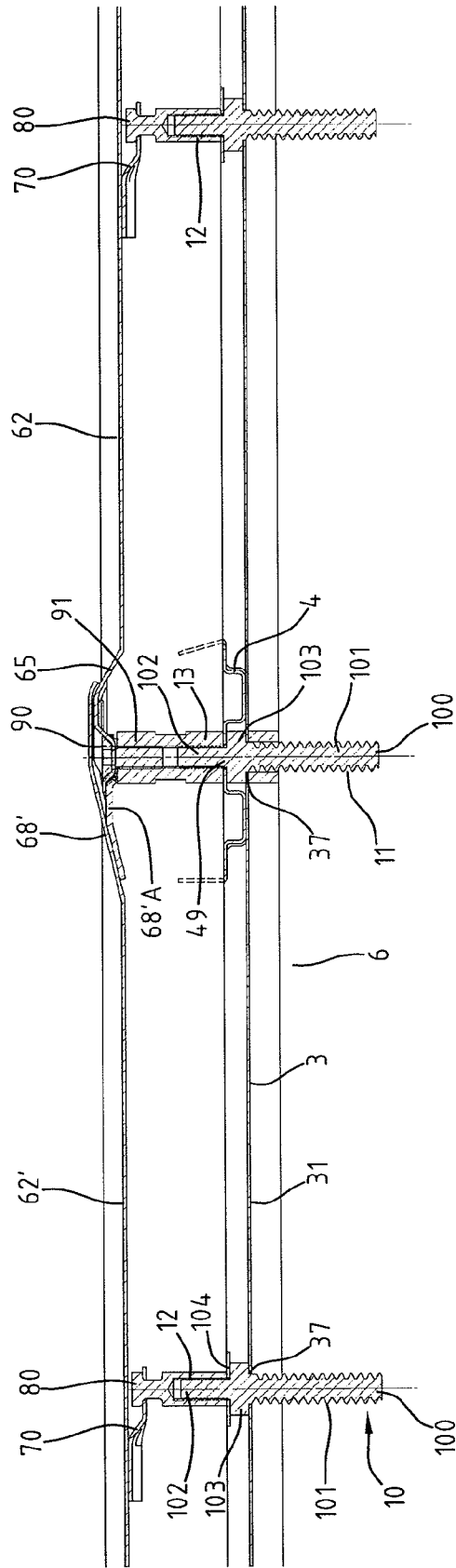
FIG. 7 is a sectional view of the means for fixing a frame to the carcass of FIG. 1 in the region of a joint between two adjacent frames.

Referring to FIG. 6, the fixing beading 62 comprises on the upper face thereof two locking lugs 70 comprising stirrups 71 adapted to be able to be fixed by clipping to the locking heads 80 of spacers 12 of fixing means 10 for fixing an upright 3 on a beam 6 (these fixing means being visible in FIG. 7).

As can also be seen in FIG. 7, the screw paddle 65 is fixed via a screw 90, which is screwed onto the screw head 91 of a spacer 13 of a fixing means 11 of an upright and a crossbar located at the joint between the upright and the crossbar. Referring to FIG. 7, the locking paddle 68' of a beading 62' extending the beading 62 covers the fixing paddle 65 of the beading 62. The covering and locking beading 68' comprises in the lower part thereof a lug 68'A which is clipped onto the end of the screw paddle 65 of the other beading. It will be noted that the beading 62, the screw paddle of which is covered by the covering and locking paddle 68' of the beading 62', is located downstream from the beading 62' relative to the slope of the roof, in such a way as to provide a good seal. In fact in this arrangement, when the rainwater falls onto the roof and drains, it drains in the direction from upstream to downstream and thus at the joint between the beading 62' and the beading 62, the water initially flows on the beading 62' then passes onto the covering paddle 68' and subsequently flows on the body of the beading 62. Thus, the rainwater does not penetrate into the corresponding holes when the fixing screw 90 passes through.

The fixing means 10 and 11 each include a screw body 100 comprising a distal screw spindle 101 which is screwed into the rafter 6 and a proximal screw spindle 102 onto which a spacer 12 or 13 is fixed by screwing.

When the fixing means is a fixing means 10 arranged between two crossbars, the spacer 12 comprises a locking head 80.

When the fixing means is a fixing means 11 arranged at the joint between a crossbar and an upright, the spacer 13 comprises a screw head 91.

The proximal and distal screw spindles 101 and 102 are separated by a rotational drive means 103 which consists of a hexagonal screw head.

It will be noted that the screw bodies 100 are screwed into the rafters 6 by passing through the holes 37 provided in the core of the upright 3, in such a way that the drive heads 103 of the screw bodies 100 come into contact with the upper face of the central rib 31 of the upright 3. In the region of the joint between an upright 3 and a crossbar 4, the crossbar 4 is then fitted onto the proximal part 102 of the screw body 100 which passes through a hole 49 provided in the core of the crossbar. A screw head 91 for receiving the screw 90 for fixing the screw paddle 65 of the fixing beading 62 is screwed onto the proximal screw spindle 102 and thus clamps the crossbar against the screw head 103.

In the regions located between two crossbars, a spacer 12 comprising a locking head 80 is screwed directly onto the proximal screw spindle 102 of the fixing means 10. Furthermore, a washer 104 is arranged between the driving head 103 of the screw spindle and the spacer 12 in such a way as to form a contact face for the side upright of a framework fixed onto the carcass. This washer has a thickness equal to the thickness of the sheet forming the crossbar, in such a way that the upper face of the washer is at the same level as the upper face of the core of a crossbar. Thus, the framework is contacted flatly on the four sides thereof.

As was mentioned, the seal between two adjacent frameworks is provided by fixing beadings which simultaneously allow a seal and fixing of the frames on the support structure. By contrast, the seal between two adjacent frames 50A and 50D arranged in a column parallel to rafters is provided by way of a side wing 61A provided on the upright of the frame 50A arranged downstream. This wing 61A, which extends outside the frame 50A, overlaps the upright of the frame 50D located downstream from the frame 50A. This overlap provides a seal in the same way as roof tiles which overlap one another.

Figure 8:
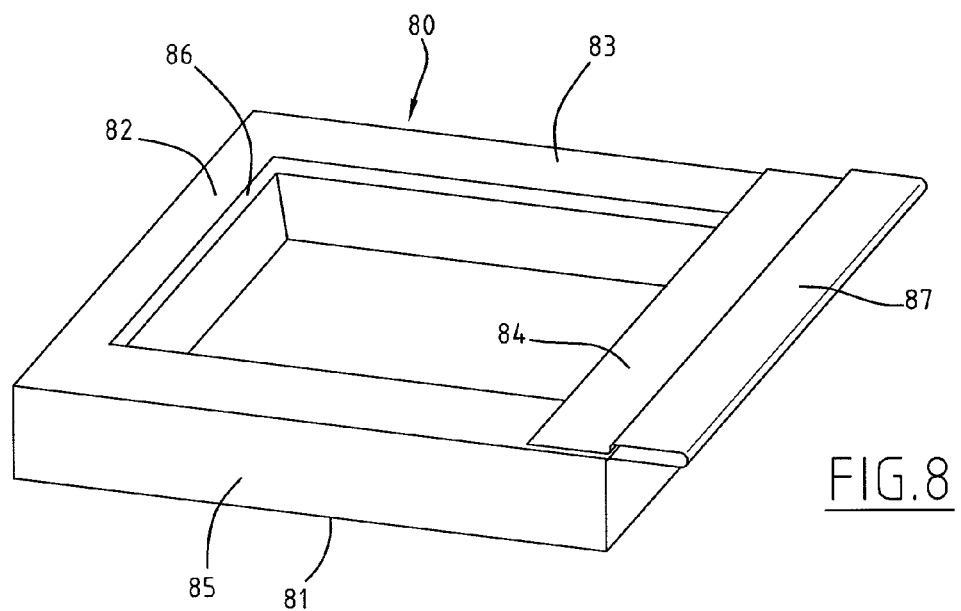
FIG. 8 is a perspective view of a frame for holding a panel which can be mounted on the structure of FIG. 1.

A frame adapted for this use is shown in FIG. 8. This frame 80 consists of a peripheral structure 81 comprising four uprights 82, 83, 84 and 85. The four uprights comprise, in the upper, inner part thereof, a groove 86 for receiving a panel. An upright 84 comprises a side wing 87, extending towards the outside at the upper part of the framework at a sufficient height to be adapted to the opposite upright of an adjacent framework.

The frameworks which have just been described may be produced by folding one or more metal strips, which are cut in an appropriate manner, then folded and finally assembled by welding. This method of production makes it possible to obtain particularly light and rigid frameworks. They are also hollow. Thus, when they are to receive electrically active panels such as photovoltaic panels, the circuits for electrically linking the panels to one another and to an external circuit can be concealed in the inside of the hollow uprights.

The structure which has just been described may be used in particular to install photovoltaic panels into a building roof. In this case, as the structure is mounted directly on the rafters, the set of photovoltaic panels is integrated into the roof. Means known per se are intended to provide a seal between the roof itself and the panels of photovoltaic cells, in such a way that rain does not penetrate under the panels at the joint between the roof and the photovoltaic panels.

A structure of this type may also be used to fix photovoltaic panels, or, more generally, electrically active panels, on a building wall, such as a wall which may be vertical. In this case, the uprights are fixed to the structure of the wall. This structure of the wall may consist of beams or concrete into which the fixing means of the uprights can be screwed.

The invention claimed is:

1. Structure for mounting, on a building wall, at least one frame having a rectangular framework, the structure comprising a carcass made of at least two uprights and at least two crossbars assembled so as to form at least one rectangular underframe adapted for receiving said frame, the structure comprising fixtures for fixing at least said frame on the carcass, each upright and each crossbar having a central core and two side wings extending upwardly from said central core and the side wings of the uprights comprising recesses for receiving the crossbars, the central cores of the crossbars extending in the recesses of the side wings of the uprights, the side wings of the crossbars comprising recesses in line with the uprights at the intersections between the crossbars and the uprights in such a way that the side wings of the uprights and the crossbars, extending on the inner periphery of the rectangular underframe, form an upwardly projecting border on which said frame may be fitted.

2. Structure according to claim 1, wherein the core of an upright comprises at least one gutter extending along the entire length of the upright.

3. Structure according to claim 2, wherein the gutter is delimited by at least one rib extending over the entire length of the upright.

4. Structure according to claim 2, wherein the core of a crossbar comprises at least one opening intended to open above the gutter of an upright on which the crossbar rests.

5. Structure according to claim 4, wherein the core of a crossbar is shaped in such a way as to have at least in the region of intersection with an upright, a face projecting in the same direction as the wings.

6. Structure according to claim 1, wherein a side wing of a crossbar is inclined towards the interior of the crossbar in such a way as to allow the attachment of a frame held by the structure.

7. Structure according to claim 1, wherein the fixtures comprise anchoring devices and fixing beadings held by the anchoring devices and extending above the uprights, the anchoring devices and the fixing beadings being provided in such a way that the fixing beadings come into contact at least with the upper face of an edge of a frame.

8. Structure according to claim 7, wherein at least one fixture comprises a locking head in the upper part thereof, and the fixing beading comprises a locking lug adapted to be clipped onto the locking head.

9. Structure according to claim 7, wherein at least one fixture comprises a screw head in the upper part thereof, and in that the fixing beading comprises at one end thereof a screw paddle adapted to be fixed to the screw head by means of a screw, and the fixing beading comprises at the other end thereof a cover paddle comprising a clipping lug adapted to be clipped onto a screw paddle.

10. Structure according to claim 8, wherein the fixture comprises of a screw body comprising a distal screw spindle for screwing into a structural element of the wall of a building and a proximal screw spindle separated from the distal screw spindle by a drive for driving the screw body, and of a spacer adapted to be screwed onto the proximal screw spindle of the screw body, the spacer comprising a locking head or screw head.

11. Structure according to claim 7, wherein the fixing beadings are adapted to extend on either side of a region separating two adjacent frames, in such a way as to provide tight covering of the separation region of the frames.

12. Building wall comprising a structure according to claim 1.

13. Building wall according to claim 12, wherein said building wall forms a roof pan and comprises parallel beams, and wherein the uprights of the structure extend along parallel beams and are fixed to the parallel beams.

14. Building wall according to claim 13, wherein it further comprises trays which are fixed to the parallel beams below the structure.

15. Building wall according to claim 14, wherein the trays are trays made of plastics materials or of glue-laminated timber or of plywood, or metal trays made of a multilayer insulating material, or double glazing panels.

16. Building wall according to claim 12, wherein said building wall comprises at least one panel of photovoltaic cells fixed to a frame by the structure.

17. Building wall according to claim 13, wherein said building wall comprises at least one panel of photovoltaic cells fixed to a frame by the structure.

18. Building wall according to claim 14, wherein said building wall comprises at least one panel of photovoltaic cells fixed to a frame by the structure.

19. Building wall according to claim 15, wherein said building wall comprising at least one panel of photovoltaic cells fixed to a frame by the structure.

* * * * *